(12) United States Patent
Sako

(10) Patent No.: US 6,854,037 B2
(45) Date of Patent: Feb. 8, 2005

(54) RECORDING/REPRODUCTION APPARATUS AND RECORDING/REPRODUCTION CONTROL METHOD

(75) Inventor: Ryuichi Sako, Kanagawa (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 10/128,765

(22) Filed: Apr. 23, 2002

(65) Prior Publication Data

US 2002/0161974 A1 Oct. 31, 2002

(30) Foreign Application Priority Data

Apr. 25, 2001 (JP) ..................................... P2001-128037

(51) Int. Cl.[7] .............................................. G06F 12/00
(52) U.S. Cl. ......................... 711/154; 711/114; 710/59
(58) Field of Search ............................... 711/154, 114; 714/6; 710/1, 59, 74

(56) References Cited

U.S. PATENT DOCUMENTS 6,108,728 A * 8/2000 Kobayashi ................... 710/74
6,336,157 B1 * 1/2002 Carbonaro et al. ........... 710/59
6,526,458 B1 * 2/2003 Steinmetz et al. ............. 710/1

* cited by examiner

Primary Examiner—Nasser Moazzami
(74) Attorney, Agent, or Firm—Frommer Lawrence & Haug LLP; William S. Frommer; Dennis M. Smid

(57) ABSTRACT

A load on a CPU which controls the entire disk array device in an audio/video server which controls hard disk drives inside the disk array device is reduced. A recording/reproduction apparatus includes a plurality of recording/reproduction devices; a control device for issuing a command which instructs a recording/reproduction operation of each of the plurality of recording/reproduction devices and for setting information which specifies the enable/disable of an interrupt in such a manner as to correspond to each issued command; and a communication processing device for performing communication which transmits the command issued by the control device with each of the recording/reproduction devices and, after the communication for each command is terminated, for sending an interrupt indicating the termination of the communication to the control device under the condition in which the information which is set in such a manner as to correspond to the command specifies interrupt enable.

2 Claims, 8 Drawing Sheets

RECORDING/REPRODUCTION APPARATUS AND RECORDING/REPRODUCTION CONTROL METHOD

BACKGROUND OF THE INVENTION

1. Field of the Invention

The present invention relates to a recording/reproduction apparatus and also to a recording/reproduction control method, which are suitably used for, for example, an A/V (Audio/Video) server.

2. Description of the Related Art

A/V servers have been widely used as recording/distribution servers for broadcasting stations. A/V servers generally record/reproduce material (video and audio) to and from random access recording media, and can input and output material simultaneously through a plurality of input/output ports.

As one type of A/V server, there is an A/V server in which a disk array device using RAID (Redundant Arrays of Inexpensive Disks) technology is provided and control of HDDs inside the disk array device is performed in accordance with the SCSI (Small Computer System Interface) standard.

A conventional process situation for recording and reproducing material in such an A/V server will be described below. FIG. 7 shows an example of the construction of the essential portions of such an A/V server. In this A/V server 30, two input ports 31 and 32, two output ports 33 and 34, and a disk array device 35 are interconnected to each other by a bus 36.

The input ports 31 and 32 include MPEG-scheme encoders 31a and 32a, and CPUs 31b and 32b, respectively. The output ports 33 and 34 include MPEG-scheme decoders 33a and 34a, and CPUs 33b and 34b, respectively.

For each of the ports 31 to 34, as shown in FIG. 8, time slots T1 to T4 each for a predetermined number of frames (for example, for 4 frames) are assigned in sequence as time slots for allowing the use of the bus 36.

The CPUs 31b and 32b of the input ports 31 and 32 cause the encoders 31a and 32a to encode (compress) the video which is input from outside the A/V server 30, respectively. Then, the coded video bit streams, to which a recording requesting command is added, are transferred from the input ports 31 and 32 to the disk array device 35 via the bus 36 within the time slots T1 and T2, respectively.

At that time, as shown in FIG. 9A, the CPUs 31b and 32b, assuming that the video bit stream for a predetermined number of frames (for example, for 16 frames) is a minimum unit, add a recording requesting command C1 to the beginning portion of each video bit stream in the minimum unit. Therefore, in the time slot T1 in which, for example, the input port 31 transfers a video bit stream for 128 frames to the disk array device 35, eight recording requesting commands C1 are sent from the input port 31 to the disk array device 35.

The CPUs 33b and 34b of the output ports 33 and 34 send a command C2 for requesting the reproduction of one of the video bit streams recorded in the disk array device 35 to the disk array device 35 via the bus 36 within the time slots T3 and T4, respectively.

At that time, the CPUs 33b and 34b, assuming that a video bit stream for 16 frames is a minimum time, also sends the reproduction requesting command C2. Therefore, in the time slot T3 in which, for example, the output port 33 causes the disk array device 35 to reproduce a video bit stream for 128 frames, similarly, eight reproduction requesting commands C2 are sent from the output port 33 to the disk array device 35.

Then, the CPUs 33b and 34b cause the decoders 33a and 34a to decode (decompress) the video bit stream supplied from the disk array device 35 and output the video bit streams from the output ports 33 and 34 to outside the A/V server 30.

FIG. 10 shows an example of the construction of the essential portions of the disk array device 35. Host adaptors 44-1 to 44-6 are connected to a CPU 41 for controlling the entire disk array device 35 via a CPU bus 42 and local buses 43-1 to 43-6, respectively.

Furthermore, six HDDs 61 to 66 incorporating disk drive controllers (hereinafter referred to simply as "controllers") 51 to 56 for SCSI are connected to the host adaptors 44-1 to 44-6 via SCSI buses 45-1 to 45-6, respectively. The host adaptors 44-1 to 44-6 function as initiators, and the controllers 51 to 56 function as targets.

Based on each recording requesting command C1 (FIG. 9A) added to the beginning portion of the video bit stream in each minimum unit, transferred from the input port 31 and the input port 32 to the disk array device 35, the CPU 41 divides the video bit stream into data to be recorded in five HDDs 61 to 65, for example, in units of one byte, as shown in FIG. 9B (This dividing process is performed by a multiplexer (not shown)). Then, the CPU 41 issues a command (command for each of the controllers 51 to 55) C3 for instructing the recording operation of each of the HDDs 61 to 66.

Furthermore, the CPU 41 creates parity data for this video bit stream which is divided in units of one byte as data to be recorded in the remaining one HDD 66 (This creation process is performed by a parity computation circuit (not shown)). Then, the CPU 41 issues a command (command for the controller 56) C3 for instructing the recording operation of the HDD 66.

Therefore, in the time slot T1 in which, for example, the video bit stream for 128 frames has been transferred (eight recording requesting commands C1 have been sent) from the input port 31 to the disk array device 35, commands C3 in units of eight are issued from the CPU 41 to each of the disk drive controllers 51 to 56 (8×6=48 commands C3 in total).

The host adaptors 44-1 to 44-6 perform communication of the transmission of data (video bit streams in units of one bit and parity data thereof) to be recorded on the HDDs 61 to 66 and the transmission of the command C3 with the controllers 51 to 56 via the SCSI buses 45-1 to 45-6, respectively, in accordance with a protocol conforming to the SCSI standard. The controllers 51 to 56 cause the HDDs 61 to 66 to execute the transmitted command C3, so that the transmitted video bit streams and the parity data are recorded on the HDDs 61 to 66, respectively.

Then, each time the communication for each command C3 with the controllers 51 to 56 is terminated, each of the host adaptors 44-1 to 44-6 sends an interrupt (external interrupt) indicating that the communication for the command C3 is terminated to the CPU 41. Each time this interrupt occurs, the CPU 41 stops the process (process for controlling the other portions inside the disk array device 35) which has been performed thus far, and performs a termination process for the command C3 (a process for checking whether or not an error has occurred in the communication for the command C3, a correction process in a case where an error has occurred, etc.).

Therefore, as described above, regarding the time slot T1 in which, for example, the video bit stream for 128 frames has been transferred from the input port 31 to the disk array device 35, a total of 48 commands C3 are issued from the CPU 41 to the disk drive controllers 51 to 56. As a result, until all the video bit streams and the parity data thereof are recorded in the HDDs 61 to 66, a total of 48 times of interrupts are sent from the host adaptors 44-1 to 44-6 to the CPU 41 (the CPU 41 stops the processing which has been performed thus far 48 times).

More generally, regarding the time slot T1 in which the n-th command C1 is sent from the input port 31, a total of 6×n times of interrupts are sent from the host adaptors 44-1 to 44-6 to the CPU 41 (the CPU 41 stops the processing which has been performed thus far 633 n times).

On the other hand, based on each reproduction requesting command C2 sent from the output port 33 and the output port 34 to the disk array device 35, the CPU 41 issues a command C4 (command for each of the disk drive controllers 51 to 56) for instructing the reproducing operation of each of the HDDs 61 to 66 (operation of reproducing the video bit stream specified by that command C2 and the parity data for the video bit stream).

Therefore, regarding the time slot T3 in which, for example, the command C2 (eight commands C2) for requesting the reproduction of the video bit stream for 128 frames is sent from the output port 33 to the disk array device 35, commands C4 in units of eight are issued from the CPU 41 to each of the controllers 51 to 56 (a total of 8×6=48 commands C4).

Each of the host adaptors 44-1 to 44-6 performs communication of the transmission of the command C4 with the controllers 51 to 56 via the SCSI buses 45-1 to 45-6, respectively, in accordance with a protocol conforming to the SCSI standard. The controllers 51 to 56 cause the HDDs 61 to 66 to execute the transmitted command C4 so as to reproduce the video bit stream and the parity data from the HDDs 61 to 66, respectively.

Then, each time the communication for each command C4 with the controllers 51 to 56 is terminated, each of the host adaptors 44-1 to 44-6 sends an interrupt indicating that the communication for the command C4 is terminated to the CPU 41. Each time this interrupt occurs, the CPU 41 stops the processing which has been performed thus far, and performs a termination process for the command C4.

Therefore, as described above, regarding the time slot T3 in which, for example, the command C2 (eight commands C2) for requesting the reproduction of the video bit streams for 128 frames is sent from the output port 33 to the disk array device 35, a total of 48 commands C4 are issued from the CPU 41 to the controllers 51 to 56. As a result, until all the video bit streams and the parity data thereof are reproduced from the HDDs 61 to 66, similarly, a total of 48 times of interrupts are sent from the host adaptors 44-1 to 44-6 to the CPU 41.

More generally, regarding the time slot T3 in which the n-th command C3 is sent from the output port 33, similarly, a total of 6×n times of interrupts are sent from the host adaptors 44-1 to 44-6 to the CPU 41 (the CPU 41 stops the processing which has been performed thus far 6×n times).

The video bit streams which are reproduced in this manner are subjected to error correction using the parity data, after which the video bit stream is transferred from the disk array device 35 to the output ports 33 and 34 via the bus 36 within the time slots T3 and T4, respectively. In the output ports 33 and 34, the transferred video bit streams are decoded (decompressed) by the decoders 33a and 34a, respectively, and are externally output from the A/V server 30.

In the manner described above, in the A/V server which performs control of HDDs inside the disk array device in conformance with the SCSI standard, conventionally, each time communication for each command between each host adaptor and the disk drive controller is terminated, an interrupt indicating the termination of the communication of that command is sent to the CPU which controls the entire disk array device.

Therefore, since a large number of times of interrupts are sometimes sent to the CPU with respect to one time slot, there is a possibility that the load on the CPU is increased, and thereby the recording/reproduction processing speed of the A/V server is decreased.

SUMMARY OF THE INVENTION

The present invention has been made in view of the above-described points. The present invention aims to reduce the load on a CPU which controls the entire disk array device in an A/V server which performs control of HDDs inside the disk array device in conformance with the SCSI standard.

To this end, in one aspect, the present invention provides a recording/reproduction apparatus comprising: a plurality of recording/reproduction means; control means for issuing a command which instructs a recording/reproduction operation of each of the plurality of recording/reproduction means and for setting information which specifies the enable/disable of an interrupt in such a manner as to correspond to each issued command; and communication processing means for performing communication which transmits the command issued by the control means with each of the recording/reproduction means and, after communication for each command is terminated, for sending an interrupt indicating the termination of the communication to the control means under the condition in which the information which is set in such a manner as to correspond to the command specifies interrupt enable.

In this recording/reproduction apparatus, a command instructing each recording/reproduction operation of a plurality of recording/reproduction means is issued from the control means, and information for specifying interrupt enable/disable is set in such a manner as to correspond to each command. Then, the communication processing means performs communication for transmitting the command with each of these recording/reproduction means. Furthermore, after the communication for each command is terminated, an interrupt indicating the termination of the communication is sent to this control means under the condition in which this information which is set to correspond to that command specifies interrupt enable.

In this manner, only when the communication for the command corresponding to the information which specifies the interrupt enable is terminated, an interrupt indicating the termination of the communication is sent to the control means.

As a consequence, the number of times of interrupts to the control means is decreased compared to a case in which an interrupt indicating the termination of the communication is sent to the control means each time the communication for each command between the communication processing means and each recording/reproduction means is terminated, and thus the load on the control means is reduced. For example, when this recording/reproduction apparatus is used in a disk array device for performing the control of HDDs in conformance with the SCSI standard inside an A/V server, the number of times of interrupts to the CPU which controls the entire disk array device is decreased, and thus the load on this CPU is reduced.

In this recording/reproduction apparatus, when a recording/reproduction request is sent from a plurality of higher-order control means within each assigned time slot, preferably, the control means sets information for specifying the interrupt enable in such a manner as to correspond to only the command which is issued on the basis of the final request sent within this time slot from each of these higher-order control means.

As a result, also, when a large number of requests are sent from the higher-order control means within one time slot, the number of times of interrupts to the control means is decreased, and thus the load on the control means can be reduced.

In another aspect, the present invention provides a recording/reproduction control method for use in a recording/reproduction apparatus comprising a plurality of recording/reproduction means; control means for issuing a command which instructs a recording/reproduction operation of each of the plurality of recording/reproduction means; and communication processing means for performing communication which transmits the command issued by the control means with each of the recording/reproduction means, the recording/reproduction control method comprising: a first step in which the control means sets information which specifies the enable/disable of an interrupt in such a manner as to correspond to each issued command; and a second step in which, after communication for each command is terminated, the communication processing means sends an interrupt indicating the termination of the communication to the control means under the condition in which the information which is set in such a manner as to correspond to the command specifies interrupt enable.

In this recording/reproduction control method, the control means for issuing a command which instructs a recording/reproduction operation of each of a plurality of recording/reproduction means sets information for specifying interrupt enable/disable in such a manner as to correspond to each command. Then, the communication processing means for performing communication for transmitting the command issued by the control means with each of these recording/reproduction means sends an interrupt indicating the termination of the communication to the control means under the condition in which this information which is set to correspond to that command specifies interrupt enable after communication for each command is terminated.

In this manner, only when the communication for the command corresponding to the information which specifies interrupt enable is terminated, an interrupt indicating the termination of the communication is sent to the control means.

As a consequence, the number of times of interrupts to the control means is decreased compared to a case in which an interrupt indicating the termination of the communication for the command is sent to the control means each time the communication for each command between the communication processing means and each recording/reproduction means is terminated, and thus the load on the control means is reduced. For example, when this recording/reproduction control method is used in a disk array device which performs the control of HDDs in conformance with the SCSI standard inside an A/V server, the number of times of interrupts to the CPU which controls the entire disk array device is decreased, and thus the load on this CPU is reduced.

Also, in this recording/reproduction control method, when a recording/reproduction request is sent from a plurality of higher-order control means to the control means within each assigned time slot, preferably, in a first step, the control means sets information for specifying interrupt enable in such a manner as to correspond to only the command issued on the basis of the final request which is sent within each time slot from each of these higher-order control means.

As a result, in a similar manner, also when a large number of requests are sent from the higher-order control means within one time slot, the number of times of interrupts to the control means is reduced, and thus the load on the control means can be reduced.

DESCRIPTION OF THE PREFERRED EMBODIMENTS

A description is given below of an example in which the present invention is used in a disk array device which controls six HDDs inside an A/V server, such as the disk array device 35 in FIG. 10 in conformance with the SCSI standard.

Figure 1:
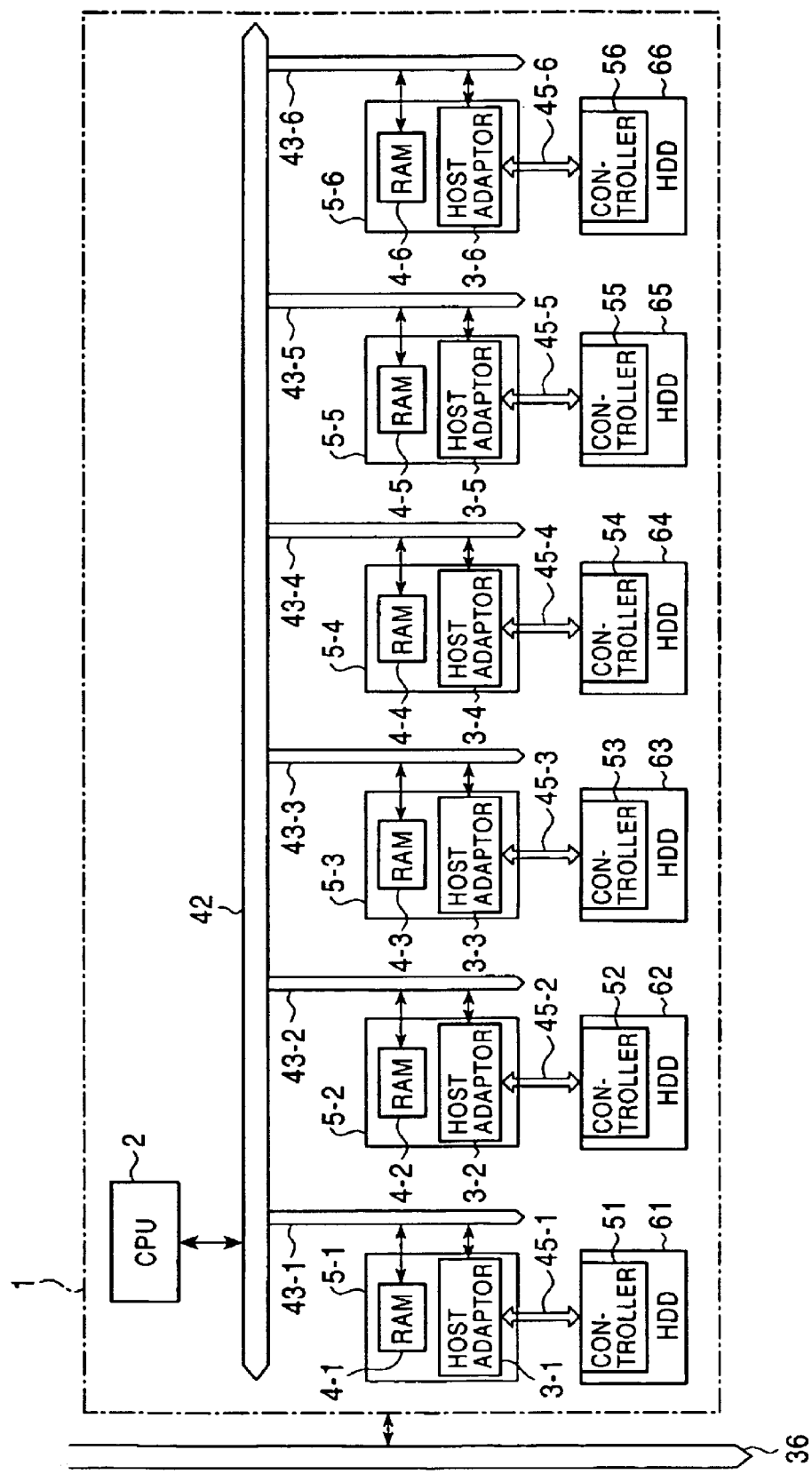
FIG. 1 shows an example of the construction of the essential portions of a disk array device according to the present invention.

FIG. 1 shows an example of the construction of the essential portions of a disk array device according to the present invention. Components in FIG. 1 which are common to those in FIG. 10 are given the same reference numerals. Host adaptors 3-1 to 3-6 and RAMs 4-1 to 4-6, which are mounted on the same substrates 5-1 to 5-6, are connected to a CPU 2 for controlling the entire disk array device 1 via a CPU bus 42 and local buses 43-1 to 43-6, respectively.

Six HDDs 61 to 66 incorporating disk drive controllers (hereinafter referred to simply as "controllers") 51 to 56 for SCSI are connected to host adaptors 3-1 to 3-6 via SCSI buses 45-1 to 45-6, respectively. The host adaptors 3-1 to 3-6 function as initiators, and the controllers 51 to 56 function as targets.

The disk array device 1 receives the bit stream described below from the input ports 31 and 32 in FIG. 7 in completely the same way as for the disk array device 35 in FIG. 10. That is, the disk array device 1 receives a video bit stream, to the beginning portion of which the recording requesting command C1 is added, in which the video bit stream for 16 frames is assumed to be a minimum unit, via the bus 36. Furthermore, the disk array device 1 receives a command described below from the output ports 33 and 34 in FIG. 7 via the bus 36, that is, a reproduction requesting command C2 in which the video bit stream for 16 frames is a minimum unit.

Figure 2:
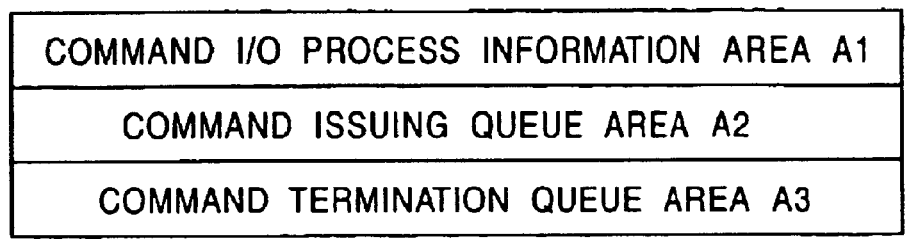
FIG. 2 shows areas within a RAM in FIG. 1.

Inside each of the RAMs 4-1 to 4-6, as shown in FIG. 2, a command I/O process information area A1, a command issuing queue area A2, and a command termination queue area A3 are provided.

The command I/O process information is information, such as a command issued by the CPU 2 to the controllers 51 to 56. Here, the command I/O process information corresponds to the commands C1 and C2 sent from the input ports 31 and 32 and the output ports 33 and 34 to the disk array device 1.

Figure 3:
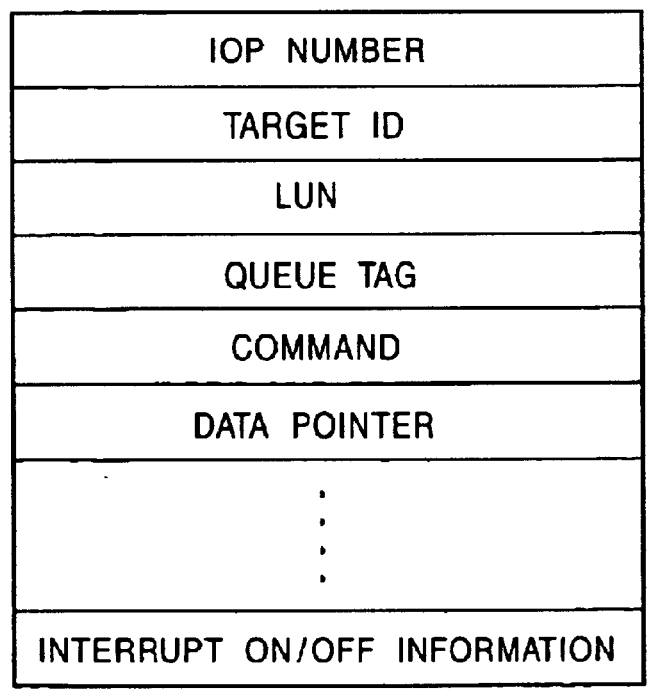
FIG. 3 shows the structure of command I/O process information.

FIG. 3 shows the structure of the command I/O process information. "IOP number" is information indicating which place the command I/O process information issued by the CPU 2 is in.

"TARGET ID" is an identification number (for example, the identification number of the controller 51 is "1", the identification number of the controller 52 is "2", . . . ) as a SCSI device of the controllers 51 to 56 which are destinations for the command issued by the CPU 2.

"LUN" is the logical unit number (here, since the HDDs 61 to 66 have the controllers 51 to 56 mounted therein, respectively, all the logical unit numbers are "0") of the device, connected to each of the controllers 51 to 56, which actually executes the above-described command.

"QUEUE TAG" is an identification number which is added to a command in order to allow commands to be identified by the logical units when the CPU 2 issues a plurality of commands for instructing the operation of the same logical units (here, the HDDs 61 to 66).

"COMMAND" is an internal command corresponding to the command (this is the command C3 for instructing the recording operation of the HDDs 61 to 66 when the recording requesting command C1 is sent, and this is the command C4 for instructing the reproducing operation of the HDDs 61 to 66 when the reproduction requesting command C2 is sent) from the CPU 2.

"DATA POINTER" is a data pointer when data (video bit streams transferred from the input ports 31 and 32, and parity data for the video bit streams) is transmitted to the controllers 51 to 56 by the CPU 2.

The command I/O process information contains, in addition to the above pieces of information, general information for performing communication with the controllers 51 to 56 in accordance with a protocol conforming to the SCSI standard.

Furthermore, as shown in FIG. 3, the command I/O process information contains "interrupt ON/OFF information". The "interrupt ON/OFF information" is information for specifying interrupt enable/disable to the CPU 2 in such a manner as to correspond to each issued command.

Figure 10:
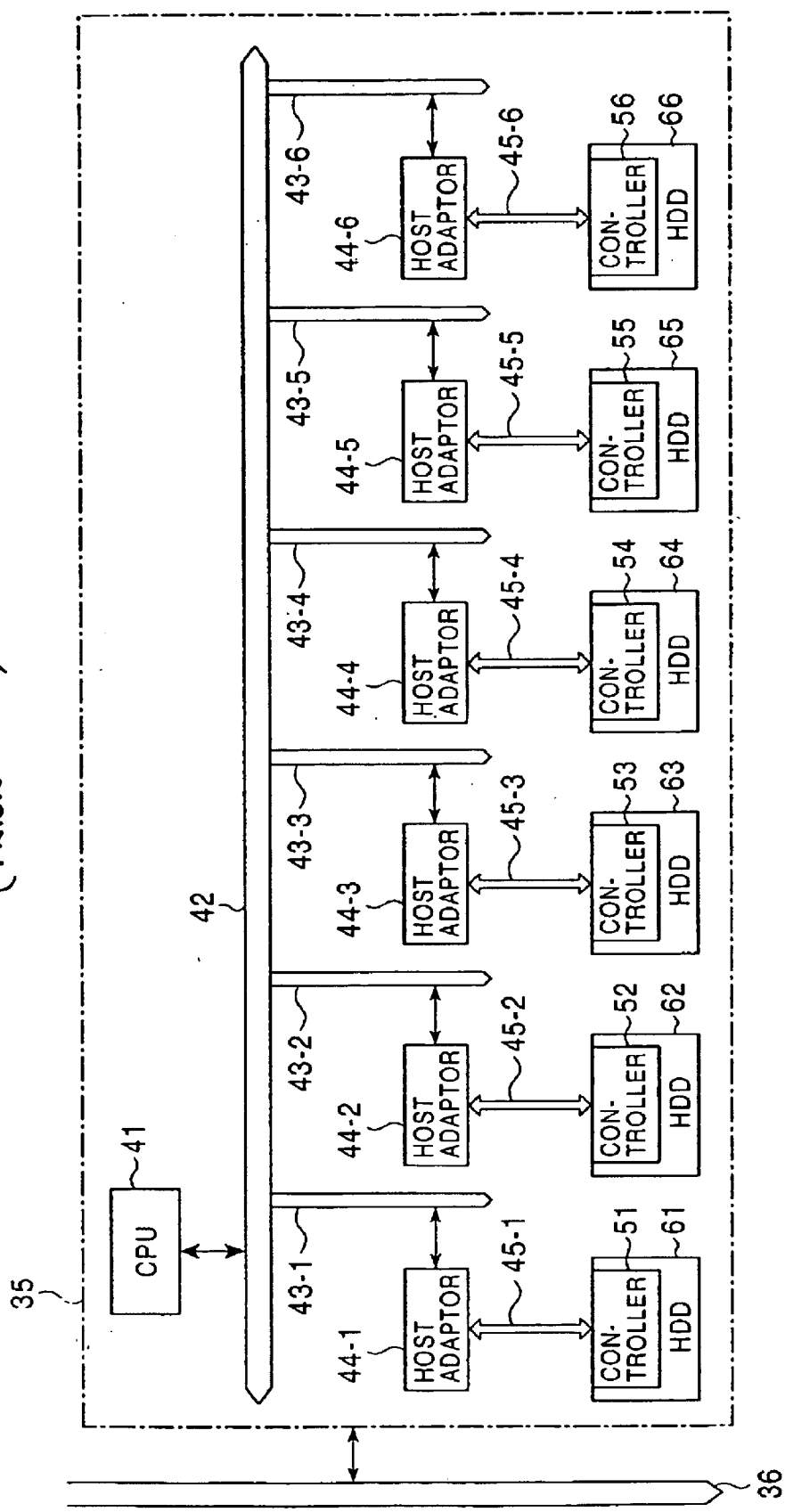
FIG. 10 shows an example of the construction of the essential portions of a disk array device in FIG. 7.

The disk array device 1 performs a recording operation which is completely the same as that of the disk array device 35 of FIG. 10. That is, the disk array device 1 records the video bit stream which is transferred and received from the input port 31 and the input port 32 in five HDDs 21 to 25 in units of 1 byte in such a manner as to be divided in the five HDDs 21 to 25. Furthermore, the disk array device 1 records parity data for this video bit stream in the HDD 26. Accordingly, the CPU 2 issues one piece of command I/O process information (a total of six) to each of the controllers 51 to 56 in such a manner as to correspond to each of the commands C1 and C2 sent from the input ports 31 and 32 and the output ports 33 and 34 to the disk array device 1.

The command I/O process information area A1 for each of the RAMs 4-1 to 4-6 is an area in which a plurality of pieces of command I/O process information destined for the controllers 51 to 56 are written, respectively. The command issuing queue area A2 and the command termination queue area A3, for each of the RAMs 4-1 to 4-6, are areas into which a plurality of "IOP numbers" in the command I/O process information destined for the controllers 51 to 56 are written in FIFO format.

Figure 4:
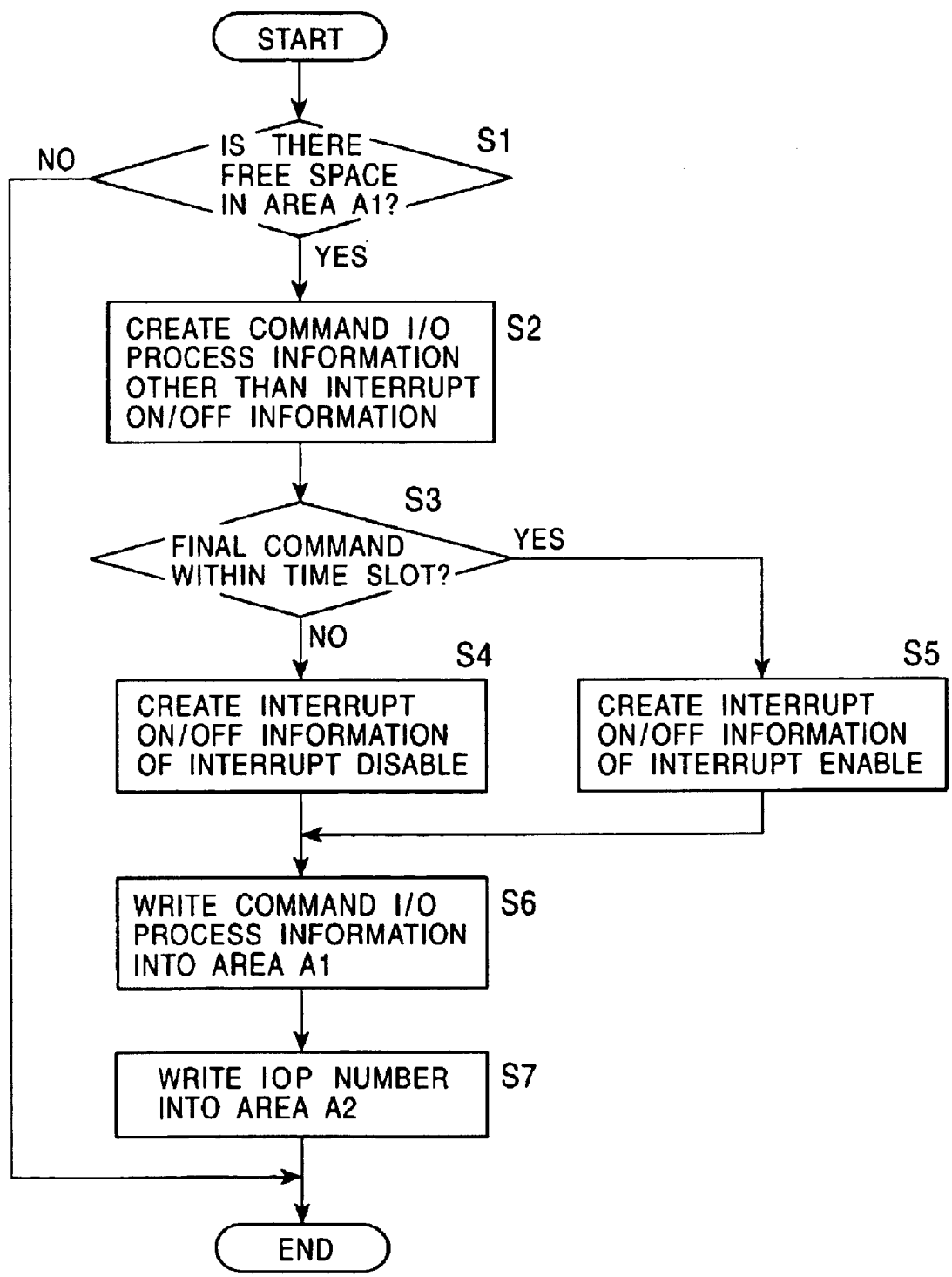
FIG. 4 is a flowchart showing an example of a process performed by a CPU in FIG. 1.
Figure 7:
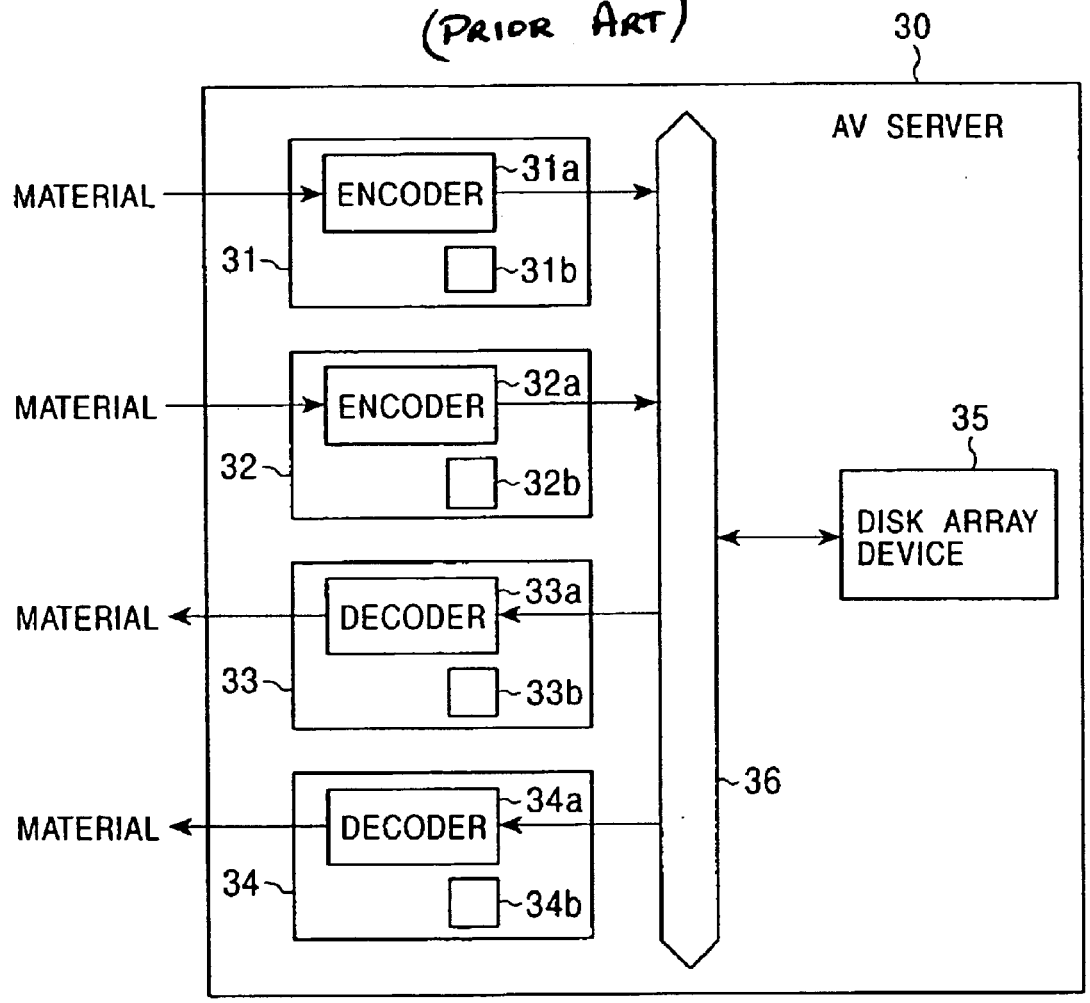
FIG. 7 shows an example of the construction of the essential portions of an A/V server.

The CPU 2 starts an issuing process such as that shown in FIG. 4 each time one command C1 and one command C2 is sent from the input ports 31 and 32 and the output ports 33 and 34 in FIG. 7.

In this issuing process, initially, the CPU 2 determines whether or not there is a free space in which command I/O process information can be newly written, in the command I/O process information area A1 (FIG. 2) inside each of the RAMs 4-1 to 4-6 (step S1). If there is no free space (the area A1 is already filled with the command I/O process information), the CPU 2 terminates the processing.

Figure 8:
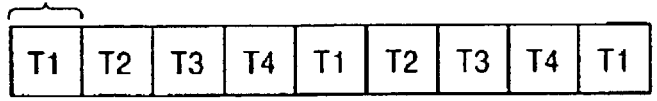
FIG. 8 shows time slots which are assigned to each port in FIG. 7.
Figure 9A:
FIG. 9A shows a state in which a command is added to a video bit stream.
Figure 9B:
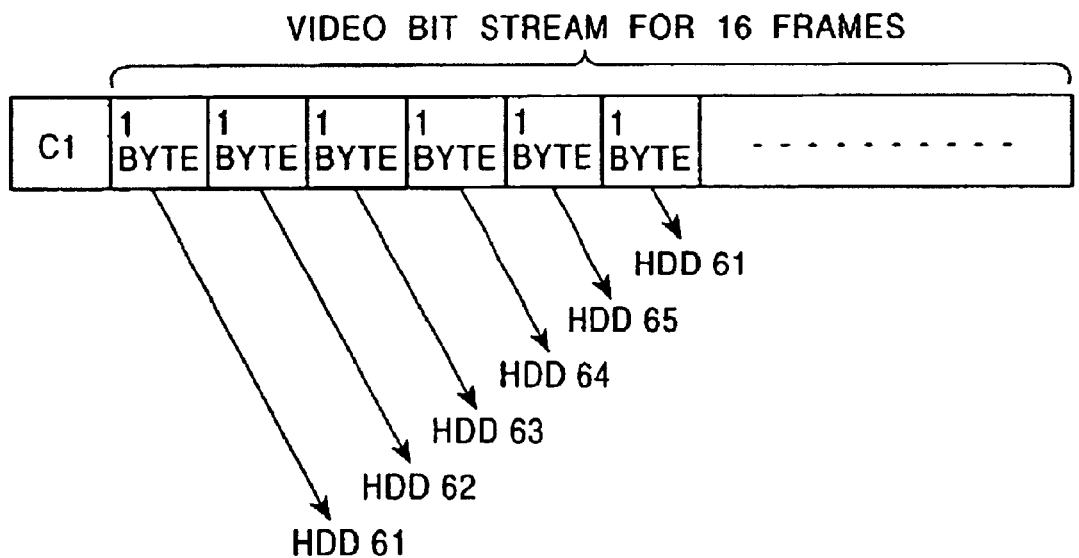
FIG. 9B shows a state in which a video bit stream is divided.

On the other hand, if there is a free space, the CPU 2 creates each piece of information (FIG. 3) other than the "interrupt ON/OFF information" within the command I/O process information destined for each of the controllers 51 to 56 (step S2). Then, the CPU 2 determines whether or not the commands C1 and C2 are the final commands which are sent from the input ports 31 and 32 and the output ports 33 and 34 within the time slots T1 and T2 and within the time slots T3 and T4 in FIG. 8, respectively (step S3).

When the determination is NO in step S3, the CPU 2 creates information for specifying interrupt disable as the "interrupt ON/OFF information" (FIG. 3) for the command I/O process information destined for each of the controllers 51 to 56 (step S4). Then, the process proceeds to step S6. When, on the other hand, the determination is YES in step S3, the CPU 2 creates information for specifying interrupt enable as the "interrupt ON/OFF information" for the command I/O process information destined for each of the controllers 51 to 56 (step S5). Then, the process proceeds to step S6.

In step S6, the CPU 2 writes the command I/O process information destined for each of the controllers 51 to 56 ("TARGET ID" is used as the identification number for the controllers 51 to 56), created in steps S2 and S4 or in steps S2 and S5, into the command I/O process information area A1 within the RAMs 4-1 to 4-6, respectively.

Next, the CPU 2 writes the "IOP number" (FIG. 3) in the command I/O process information for each of the controllers 51 to 56, created in step S2, into the command issuing queue area A2 (FIG. 2) in each of the RAMs 4-1 to 4-6 (step S7). The processing is then terminated.

Figure 5:
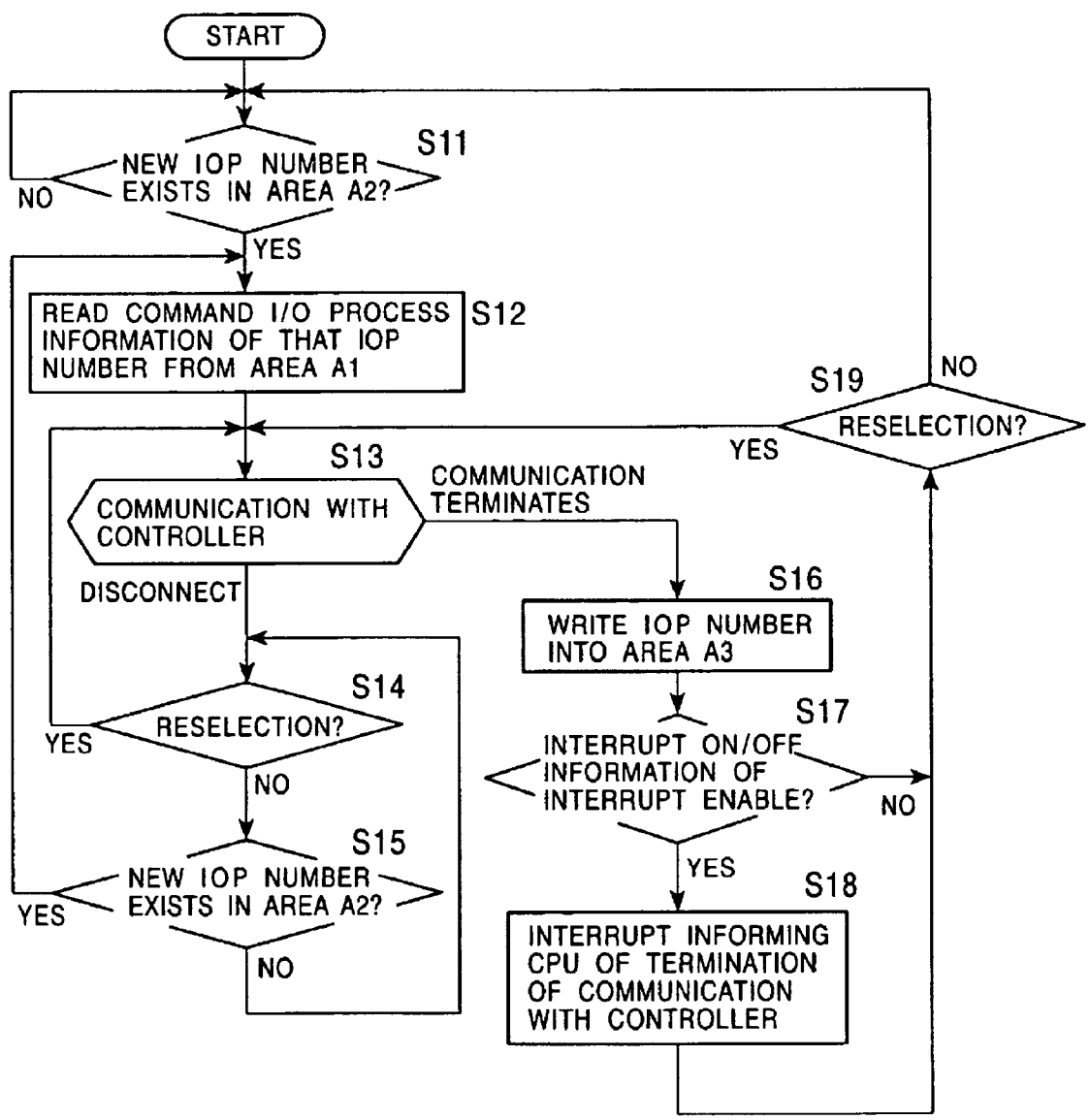
FIG. 5 is a flowchart showing an example of a process performed by a host adaptor in FIG. 1.

Each of the host adaptors 3-1 to 3-6 performs a communication process such as that shown in FIG. 5. In this communication process, initially, the host adaptor makes a determination described below for the corresponding (connected to the same local bus of the local buses 43-1 to 43-6 as for that host adaptor) RAM of the RAMs 4-1 to 4-6. That is, the host adaptor repeatedly determines whether or not a new "IOP number" is written into the command issuing queue area A2 (step S11). Here, the new "IOP number" refers to a "IOP number" of the command I/O process information which has not yet been read in this communication process.

Then, when the determination becomes YES, the host adaptor reads the command I/O process information having the "IOP number" from the command I/O process information area A1 within the corresponding RAM (step S12). In a case where a plurality of new "IOP numbers" have been written, the reading is performed for the "IOP number" which was written first.

Then, the host adaptor performs communication of the transmission of the internal command indicated by the "COMMAND" within that command I/O process information with the controller indicated by the "TARGET ID" in that command I/O process information among the controllers 51 to 56 in accordance with a protocol conforming to the SCSI standard via the SCSI buses 45-1 to 45-6. For example, in the case of the recording requesting command C3, the contents of the internal command are the video bit streams and the parity data for the video bit streams transferred from the input ports 31 and 32. As a result of the issuing process step S6 in FIG. 4, the controllers herein are the controllers 51 to 56 with regard to the RAMs 4-1 to 4-6, respectively.

When the communication with that controller is stopped as a result of a disconnect message being sent from the corresponding controller in the middle of performing this communication, the host adaptor repeatedly determines whether or not a reselection message is sent from that controller (step S14) and performs the same determination as in step S11 (step S15).

When the determination is YES in step S14, the process returns to step S13, where communication with that controller is restarted.

On the other hand, when the determination is YES in step S15, the process proceeds to step S12, where new command I/O process information is read. Then, the process proceeds to step S13, where the host adaptor performs the communication of the transmission of the command indicated by "COMMAND" in the new command I/O process information with that controller.

When the communication is terminated completely in step S13, the host adaptor writes the "IOP number" in the command I/O process information into the command termination queue area A3 within the corresponding RAM (step S16).

Next, the host adaptor determines whether or not "interrupt ON/OFF information" in the command I/O process information is information which specifies interrupt enable (step S17).

When the determination is NO (when the "interrupt ON/OFF information" is information which specifies interrupt disable), the process proceeds directly to step S19. When, on the other hand, the determination is YES, the host adaptor sends an interrupt indicating that the communication with the controller is terminated to the CPU 2 (step S18). Then, the process proceeds to step S19.

In step S19, the host adaptor performs the same determination as that in step S14. When the determination is YES, the process returns to step S13, where the communication with the controller is restarted. When, on the other hand, the determination is NO, the process returns to step S11.

Figure 6:
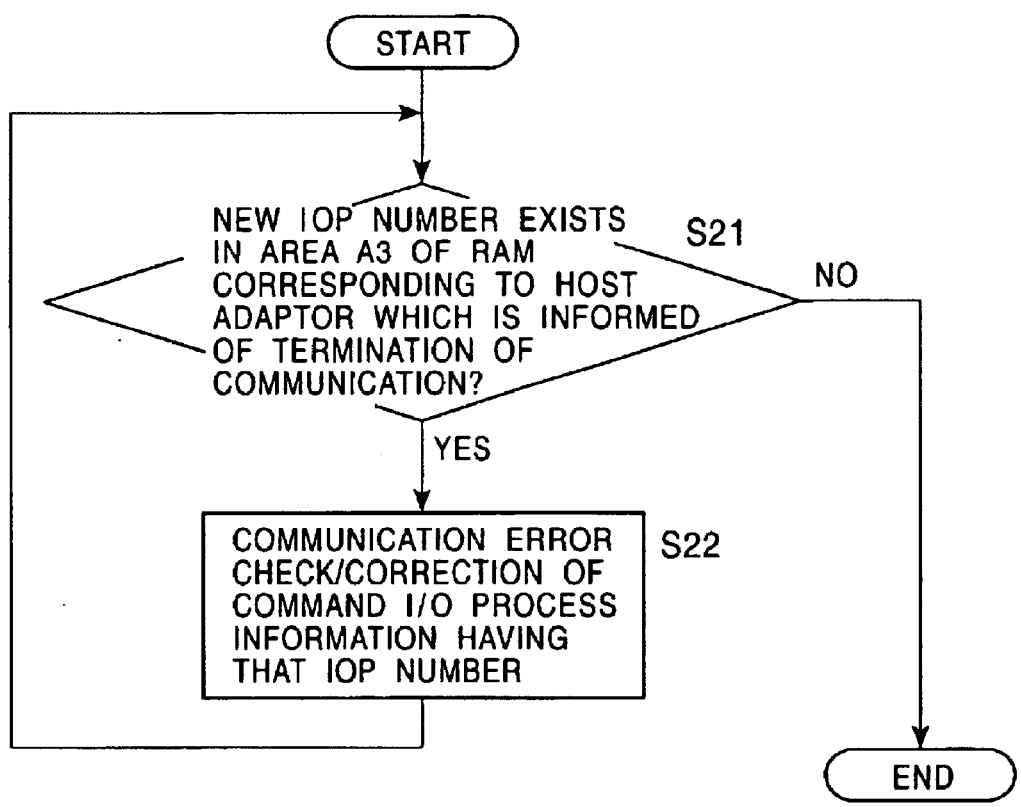
FIG. 6 is a flowchart showing an example of a process performed by the CPU in FIG. 1.

Each time the CPU 2 receives an interrupt from the host adaptors 3-1 to 3-6 (step S18 in FIG. 5), the CPU 2 starts a termination process such as that shown in FIG. 6. In this termination process, initially, the CPU 2 determines whether or not a new "IOP number" (an "IOP number" of the command I/O process information for which this termination process is not yet performed) is written into the command termination queue area A3 (FIG. 2) corresponding to the host adaptors 3-1 to 3-6 in which an interrupt has occurred (informed of the termination of the communication) among the RAMs 4-1 to 4-6 (step S21).

When the determination is YES, the CPU 2 performs a process of checking whether or not an error has occurred in the communication for the command I/O process information having the "IOP number", and performs a correction process when an error has occurred (step S22). Then, the process returns to step S21, where, when a plurality of new IOP numbers have been written, the above-described process is performed for the "IOP number" which was written first in FIFO format.

In this manner, the CPU 2 performs a termination process for each piece of the command I/O process information in which the "IOP number" is written into the command termination queue area for the controller.

Next, a description is given of a state of a material recording/reproduction process in the A/V server provided with this disk array device 1 by using, as an example, the time slot T1 in which the input port 31 of FIG. 7 transfers a video bit stream for 128 frames.

Within the time slot T in which the input port 31 transfers a video bit stream for 128 frames, as has already been described as a recording/reproduction process in the A/V server provided with this disk array device 35 of FIG. 10, eight recording requesting commands C1 are sent from the input port 31.

Therefore, with regard to this time slot T1, since the CPU 2 performs the issuing process of FIG. 4 eight times, the command I/O process information for the controllers 51 to 56 is written in units of eight into the area A1 within each of the RAMs 4-1 to 4-6.

Then, of the eight pieces of the command I/O process information written into each of the RAMs 4-1 to 4-6, for the seven pieces of the command I/O process information which were issued with regard to the first to seventh commands C1, since the determination is NO in step S3 in FIG. 4, the command I/O process information becomes command I/O process information containing the "interrupt ON/OFF information" which specifies interrupt disable (steps S4 and S6 in FIG. 4).

On the other hand, of the eight pieces of the command I/O process information written into each of the RAMs 4-1 to 4-6, for the one command I/O process information which was issued with regard to the eighth command C1, since the determination is YES in step S3 in FIG. 4, the command I/O process information becomes command I/O process information containing the "interrupt ON/OFF information" which specifies interrupt enable (steps S5 and S6 in FIG. 4).

Each of the host adaptors 3-1 to 3-6 performs communication (step S13) of the transmission of the command C3 and the transmission of the video bit stream and the parity data with the controllers 51 to 56, in units of eight times, in the communication process of FIG. 5 in accordance with eight pieces of the command I/O process information written into the area A1 within the RAMs 4-1 to 4-6, respectively. The controllers 51 to 56 cause the HDDs 61 to 66 to execute the transmitted command C3, respectively, so that the transmitted video bit stream and the parity data are recorded in the HDDs 61 to 66, respectively.

In the first to seventh communications of these eight communications, since the "interrupt ON/OFF information"

in the command I/O process information is information which specifies interrupt disable, the host adaptor writes the "IOP number" in the command I/O process information into the command termination queue area A3 (FIG. 2) (step S17 in FIG. 5), but does not interrupt the CPU 2.

On the other hand, in the eighth communication of these eight communications, since the "interrupt ON/OFF information" in the command I/O process information is information which specifies interrupt enable, the host adaptor writes the "IOP number" in the command I/O process information into the command termination queue area A3, and sends an interrupt indicating the termination of the communication to the CPU 2 (step S18 in FIG. 5).

As a consequence, from the host adaptors 3-1 to 3-6, an interrupt is sent to the CPU 2 one time for each of the host adaptors 3-1 to 3-6 (a total of six times).

Based on the interrupt from each of the host adaptors 3-1 to 3-6, the CPU 2 collectively performs a termination process for the eight pieces of the command I/O process information in which the "IOP number" is written into the command termination queue area A3 within the RAMs 4-1 to 4-6, respectively, in the termination process of FIG. 6.

In this manner, until all the video bit streams for 128 frames and the parity data, transferred from the input port 31 within the time slot T1, are recorded in the HDDs 61 to 66, interrupts are sent from the host adaptors 3-1 to 3-6 to the CPU 2 a total of six times (the CPU 2 stops the processing which is being performed six times).

As a consequence, in the A/V server provided with the disk array device 35 of FIG. 10, whereas a total of 48 times of interrupts are sent from the host adaptors 44-1 to 44-6 to the CPU 41 until all the video bit streams for 128 frames and the parity data are recorded in the HDDs 61 to 66 in the manner described above (the CPU 41 stops the processing which is being performed 48 times), the number of times of interrupts is reduced to ⅙.

More generally, regarding the time slot T1 in which n commands C1 are sent from the input port 31, in the A/V server provided with the disk array device 35 of FIG. 10, whereas interrupts are sent 6×n times to the CPU 41, in the A/V server provided with the disk array device 1, interrupts are sent six times from the host adaptors 3-1 to 3-6 to the CPU 2 regardless of the value of n. Therefore, the number of times of interrupts is reduced to 1/n.

In the foregoing, a description has been given by taking, as an example, the time slot T1 in which the recording requesting command C1 is sent from the input port 31 of FIG. 7. The same applies to the time slot T2 in which the recording requesting command C1 is sent from the input port 32 and to the time slots T3 and T4 in which the reproduction requesting command C2 is sent from the output ports 33 and 34. That is, the number of times of interrupts from the host adaptors 3-1 to 3-6 to the CPU 2 is decreased.

In the manner described above, in this disk array device 1, with regard to the individual time slots T1 to T4 in which the commands C1 and C2 are sent from the input ports 31 and 32 and the output ports 33 and 34, interrupts are sent six times, which is the number of HDDs 61 to 66, from the host adaptors 3-1 to 3-6 to the CPU 2 regardless of the number of these commands C1 and C2.

Therefore, since, with regard to one time slot, a large number of times (seven times or more) of interrupts are not sent from the host adaptors 3-1 to 3-6 to the CPU 2, the load on the CPU 2 is reduced. As a result, a decrease in the recording/reproduction processing speed of the A/V server, caused by an increase in the load on the CPU 2, can be prevented.

In the above examples, the present invention is applied to a disk array device having six HDDs. Of course, the present invention may be applied to a disk array device having any desired number of HDDs. When the number of HDDs is denoted as N, with regard to the individual time slots T1 to T4 in which the commands C1 and C2 are sent from the input ports 31 and 32 and the output ports 33 and 34, interrupts are sent N times from the host adaptors 3-1 to 3-6 to the CPU 2 regardless of the number of these commands C1 and C2.

In the above examples, the present invention is applied to a disk array device which performs the control of HDDs in accordance with the SCSI standard. In addition, the present invention may be applied to a disk array device which performs the control (communication of the transmission of a command is performed in accordance with a protocol other than the protocol of the SCSI standard) of HDDs in accordance with a standard other than the SCSI standard.

In the above examples, the present invention is applied to a disk array device inside an A/V server. In addition, the present invention may be applied to a disk array device other than that.

In the above examples, the present invention is applied to a disk array device. In addition, the present invention may be applied to a recording/reproduction apparatus using any desired recording medium (for example, an optical disk) other than a hard disk.

What is claimed is:

1. A recording/reproduction apparatus comprising:

a plurality of recording/reproduction means;

control means for issuing a command which instructs a recording/reproduction operation of each of said plurality of recording/reproduction means and for setting information which specifies the enable/disable of an interrupt in such a manner as to correspond to each issued command; and communication processing means for performing communication which transmits the command issued by said control means with each of said recording/reproduction means and, after communication for each command is terminated, for sending an interrupt indicating the termination of the communication to said control means under the condition in which said information which is set in such a manner as to correspond to the command specifies interrupt enable, wherein a recording/reproduction request from a plurality of higher-order control means is sent to said control means within each assigned time slot, and said control means sets information which specifies interrupt enable in such a manner as to correspond to only the command which is issued on the basis of the final request which is sent within each of said time slots from each of said higher-order control means.

2. A recording/reproduction control method for use in a recording/reproduction apparatus comprising a plurality of recording/reproduction means; control means for issuing a command which instructs a recording/reproduction operation of each of said plurality of recording/reproduction means; and communication processing means for performing communication which transmits the command issued by said control means with each of said recording/reproduction means, said recording/reproduction control method comprising:

a first step in which said control means sets information which specifies the enable/disable of an interrupt in such a manner as to correspond to each issued command; and a second step in which, after communication for each command is terminated, said communication processing means sends an interrupt indicating the termination of the communication to said control means under the condition in which said information which is set in such a manner as to correspond to the command specifies interrupt enable; and a step of sending a recording/reproduction request from a plurality of the higher-order control means to said control means within each assigned time slot, wherein, in said first step, said control means sets information for specifying interrupt enable in such a manner as to correspond to only the command which is issued on the basis of said final request sent from each of said higher-order control means within this time slot.

* * * * *